Patented May 26, 1936

2,041,702

UNITED STATES PATENT OFFICE 2,041,702

CONDENSATION PRODUCTS OF HIGH MOLECULAR WEIGHT POLYHYDRIC ALCOHOLS AND PROCESSES FOR MAKING THE SAME

Harry Eatough, Wilmington, Del., assignor to E. I. du Pont de Nemours & Company, Wilmington, Del., a corporation of Delaware No Drawing. Application June 15, 1934, Serial No. 730,784

14 Claims. (Cl. 260—151)

This invention relates to dehydration condensation products of high molecular weight aliphatic polyhydric alcohols, and particularly to dehydration condensation products of such polyhydric alcohols containing a secondary or tertiary hydroxyl group.

Octadecanediol is a saturated glycol produced by the hydrogenation of the double bonds as well as the carboxyl group of castor oil and its derivatives. A process for the manufacture of this substance is described in copending application Serial No. 584,576, filed January 2, 1932. Polymeric condensation products of octadecanediol such as those obtained by the processes of the present invention have not heretofore been prepared.

An object of this invention is the provision of a process for the preparation of dehydration condensation products from high molecular weight aliphatic polyhydric alcohols. A further object is the preparation of such condensation products from octadecanediol. Other objects will appear hereinafter.

These objects are accomplished by the following invention wherein a high molecular weight aliphatic polyhydric alcohol and particularly a high molecular weight glycol such as octadecanediol is heated at an elevated temperature with a dehydrating condensation catalyst such as sodium hydroxide for a relatively long period of time. The products are of a polymeric nature, and are formed for example by the dehydration and combination of several molecules of octadecanediol. The following examples are illustrative of certain embodiments of the invention but are not to be regarded as limitative.

Example 1

Thirty grams of pure octadecanediol was heated at 230° C. and 15 mm. pressure for sixteen hours with a small flake of sodium hydroxide about ⅛ inch square. The product was still a brittle solid when cooled. A slightly larger piece of sodium hydroxide was added, and heating was continued for 24 hours at 230–245° C. and 20 mm. pressure. The freezing point of the product fell from 67° C. to about 50° C., indicating that a change was slowly taking place. An additional 24 hours of heating further reduced the freezing point of the solid to 42° C. After still another 24-hour period of heating the product had changed to a viscous liquid which started to solidify at 24° C. At room temperature the material was a soft waxy solid.

Example 2

Forty-four grams of octadecanediol and 0.3 g. of sodium hydroxide were heated at 235°–240° C. and 20 mm. pressure for 88 hours. The temperature was then raised to 260°–275° C. and the heating continued under 15 mm. pressure for 70 hours. The product was a soft, waxy solid. The molecular weight of the compound, as determined from the lowering of the freezing point of benzene, was 1530. Analysis on an ash-free basis, i. e., corrected for the sodium hydroxide present, gave carbon 80.9%, hydrogen 12.9%, and oxygen 6.2%. Analysis by quantitative acetylation indicated the presence of residual hydroxyl groups and approximately 3 double bonds per molecule of condensation product.

Example 3

Two hundred fifty grams of castor oil together with 20 g. of acid extracted copper chromite catalyst was charged into a shaker tube built to withstand high pressure. The reaction tube was heated to 265° C. and was maintained at a hydrogen pressure of 3000 lbs./sq. in. for 2.75 hours. On separation of the catalyst there was obtained 210 g. of product having a freezing point of 52°–53° C., a saponification number of 2.15 and an iodine number of 2.3. Fifty grams of the crude hydrogenation product was heated with 1.25 g. of sodium hydroxide for 63.5 hours at 260°–275° C. under 13 mm. pressure. The product when cold was a jelly-like colorless solid.

Example 4

Fifty grams of hydrogenated castor oil obtained as in Example 3 and 1.25 g. of sodium hydroxide were heated at 275°–290° C. for 66.5 hours. The product was a soft solid which was dark in color. It was not homogeneous, that portion which had been exposed to the air at the surface being harder than that at the bottom of the mass.

Example 5

A shaker tube built to withstand high pressure was charged with 250 g. of ethyl ricinoleate and 10 g. of nickel-on-kieselguhr catalyst. The reaction tube was heated to 135° C., and a hydrogen pressure of 1500 lbs./sq. in. was maintained with shaking for 45 minutes. The product of the reaction was separated from the catalyst and the crude ethyl hydroxystearate was then hydrogenated again, using acid extracted copper chromite as the catalyst at 260° C. and 300 lbs./sq. in. hydrogen pressure.

Fifty grams of the crude octadecanediol from the hydrogenation of the ethyl hydroxystearate was heated with 1.25 g. of sodium hydroxide for 154 hours at 30 mm. pressure and a temperature of 275°–280° C. The product was a thick viscous oil which was rather dark in color.

Example 6

Sixty grams of crude octadecanediol from the hydrogenation of ethyl ricinoleate was divided into 3 equal parts. To one part was added 0.3 g. of aluminum oxide; to another part, 0.3 g. of aluminum hydroxide; and to the third part, 0.3 g. of calcium hydroxide. The flasks containing these charges were heated for 8 hours at 130° C/7 mm., then 8 hours at 190° C/3 mm., and finally 66 hours at 200–215° C/1 mm. The octadecanediol originally melted at 68–70° C. and the products melted at 40° C., 38° C., and 50° C., respectively. All of the products were non-volatile at 215° C/1 mm., and were waxy in composition.

Condensation products of the present invention may be obtained by treating either pure octadecanediol or the crude products obtained from the hydrogenation of such materials as castor oil, ethyl ricinoleate, and other compounds which give substantial quantities of octadecanediol. Other polyhydric alcohols which may be treated to produce condensation products according to the processes of this invention include 1,9,11-trihydroxyoctadecane, decamethylene glycol, and higher analogs of decamethylene glycol. Polyhydric alcohols containing one primary and at least one secondary or tertiary hydroxyl group are preferred.

The following examples illustrate the application of the process of the present invention to polyhydric alcohols other than octadecanediol. The products obtained were similar in every case to those obtained on heating octadecanediol with sodium hydroxide.

Example 7

Twenty grams of decamethylene glycol and a small piece of sodium hydroxide (less than 0.1 g.) were heated under the conditions of Example 6. The product was a soft, pasty, brownish material which melted at 47° C. and was non-volatile at 210° C/1 mm. The original decamethylene glycol melted at 72–74° C. and boiled at 140–150° C/1 mm.

Example 8

Fifteen grams of 1,9,11-trihydroxy octadecane (m. p. 80–81° C.) and a small piece of sodium hydroxide were heated as described in Example 6. The product was a soft, waxy, grayish material.

The condensation of high molecular weight polyhydric alcohols, and particularly of high molecular weight glycols, that is glycols and polyhydric alcohols containing at least 10 carbon atoms, as practiced in the present invention, requires the presence of condensation catalysts. Alkali and alkaline earth catalysts such as sodium or calcium hydroxides or oxides are particularly useful catalysts. Sodium hydroxide is preferred. The condensation catalyst need not be an alkali or alkaline earth hydroxide or oxide, but other dehydrating hydroxides or oxides such as aluminum hydroxide or oxide may be used, as disclosed in Example 6. The preferred quantity of sodium hydroxide or other catalyst varies from a trace to 2%. Larger quantities are effective, but not in general advisable.

The process of the present invention may be carried out at atmospheric pressure, but the use of a relatively high vacuum is preferred in order to expedite the reaction. The absence of air, or oxygen, is advisable.

The temperature at which condensation may be effected is limited only by the melting point and the boiling point of the reactant at the pressure employed. After the first stages of condensation when no more monomer remains, the temperature may be raised. Elevated temperatures in the range 200°–300° C. are preferable as the reaction proceeds more rapidly under such conditions. Octadecanediol melts at 66°–67° C., and boils at 180°–182° C. at a pressure of 0.5–1.0 mm.

The product obtained varies according to the time and temperature of reaction. The condensation progresses as the heating is continued and therefore the molecular weight of the product increases. The products obtained range from viscous oils to rather firm waxy solids.

The processes of the present invention produce new and useful products simply and economically. The waxy properties of the products may be utilized in paper or leather finishes; in furniture, floor, or automobile polishes; artificial leather; or coating compositions. Other uses are to be found in the compounding of rubber and in synthetic resins, as well as in softeners for nitrocellulose, cellulose acetate, or ethyl cellulose compositions. By controlling the condensation of octadecanediol in a suitable manner, products are obtained which are useful for lowering the pour-point of lubricating oils.

The above description and examples are intended to be illustrative only. Any modification of or variation therefrom which conforms to the spirit of the invention is intended to be included within the scope of the claims.

I claim:

1. Process of preparing condensation products of a polyhydric alcohol of at least 10 carbon atoms, which comprises heating said polyhydric alcohol at an elevated temperature of at least 130° C. in the presence of a condensation catalyst of the class consisting of dehydrating oxides and hydroxides.

2. Process of preparing condensation products of a polyhydric alcohol of at least 10 carbon atoms containing one primary and at least one secondary alcoholic hydroxyl group, which comprises heating said polyhydric alcohol at an elevated temperature of at least 130° C. in the presence of a condensation catalyst of the class consisting of dehydrating oxides and hydroxides.

3. Process of preparing condensation products of octadecanediol, which comprises heating an octadecanediol at an elevated temperature of at least 130° C. in the presence of a condensation catalyst from the class consisting of dehydrating oxides and hydroxides.

4. Process of preparing condensation products of octadecanediol, which comprises heating an octadecanediol at a temperature of 200°–300° C. in the presence of a condensation catalyst from the class consisting of dehydrating oxides and hydroxides.

5. Process of preparing condensation products of octadecanediol, which comprises heating an octadecanediol at 200°–300° C. in the presence of a condensation catalyst, said catalyst being a derivative of $H_2O$ wherein at least one hydrogen atom is replaced by a metal of the A families of the first two groups of the periodic system.

6. Process of preparing condensation products of octadecanediol, which comprises heating an octadecanediol at 200°–300° C. in the presence of sodium hydroxide until the freezing point is substantially reduced.

7. As a new product, a dehydration condensation polymer of a polyhydric alcohol of at least 10 carbon atoms.

8. As new products, dehydration condensation polymers of an octadecanediol.

9. As a new product, the condensation polymer of octadecanediol obtainable by heating an octadecanediol in the presence of sodium hydroxide at an elevated temperature of at least 130° C.

10. Process of preparing condensation products of octadecanediol–1,12, which comprises heating octadecanediol-1,12 at an elevated temperature of at least 130° C. in the presence of a condensation catalyst from the class consisting of dehydrating oxides and hydroxides.

11. Process of preparing condensation products of octadecanediol–1,12, which comprises heating octadecanediol-1,12 at a temperature of 200°–300° C. in the presence of a condensation catalyst from the class consisting of dehydrating oxides and hydroxides.

12. Process of preparing condensation products of octadecanediol–1,12, which comprises heating octadecanediol–1,12 at 200°–300° C. in the presence of a condensation catalyst, said catalyst being a derivative of $H_2O$ wherein at least one hydrogen atom is replaced by a metal of the A families of the first two groups of the periodic system.

13. Process of preparing condensation products of octadecanediol–1,12, which comprises heating octadecanediol–1,12 at 200°–300° C. in the presence of sodium hydroxide until the freezing point is substantially reduced.

14. As a new product, the condensation polymer of octadecanediol–1,12 obtainable by heating octadecanediol-1,12 in the presence of sodium hydroxide at an elevated temperature of at least 130° C.

HARRY EATOUGH.